(12) United States Patent
Zhang et al.

(10) Patent No.: US 7,890,814 B2
(45) Date of Patent: Feb. 15, 2011

(54) SOFTWARE ERROR REPORT ANALYSIS

(75) Inventors: Dongmei Zhang, Redmond, WA (US); Yingnong Dang, Beijing (CN); Xiaohui Hou, Beijing (CN); Song Huang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 671 days.

(21) Appl. No.: 11/823,213

(22) Filed: Jun. 27, 2007

(65) Prior Publication Data

US 2009/0006883 A1 Jan. 1, 2009

(51) Int. Cl.
*G06F 11/00* (2006.01)

(52) U.S. Cl. .............................. 714/45; 714/48; 714/25; 717/101

(58) Field of Classification Search ................... 714/45, 714/1, 25, 48, 57; 717/101
See application file for complete search history.

(56) References Cited

U.S. PATENT DOCUMENTS

| | | | |
|---|---|---|---|
| 5,467,449 A * | 11/1995 | Gauronski et al. ............. 714/57 |
| 5,611,043 A | 3/1997 | Even et al. |
| 6,052,697 A * | 4/2000 | Bennett et al. ...................... 1/1 |
| 6,629,267 B1 * | 9/2003 | Glerum et al. ................. 714/38 |
| 6,785,848 B1 * | 8/2004 | Glerum et al. ................. 714/38 |
| 6,981,182 B2 * | 12/2005 | Roddy et al. ................... 714/47 |
| 7,020,797 B2 | 3/2006 | Patil et al. |
| 7,036,052 B2 | 4/2006 | Pierce et al. |
| 7,103,831 B1 | 9/2006 | Krieger et al. |
| 7,143,313 B2 | 11/2006 | 't Hooft et al. |
| 7,149,928 B2 | 12/2006 | van Os |
| 7,168,009 B2 | 1/2007 | Darringer et al. |
| 7,191,364 B2 | 3/2007 | Hudson et al. |
| 7,257,743 B2 * | 8/2007 | Glerum et al. ................. 714/48 |
| 7,325,013 B2 * | 1/2008 | Caruso ............................. 1/1 |
| 7,325,166 B2 * | 1/2008 | Maguire ....................... 714/38 |
| 7,590,966 B2 * | 9/2009 | Sandstrom et al. ............ 716/19 |
| 2003/0066049 A1 * | 4/2003 | Atwood et al. .............. 717/101 |
| 2004/0064293 A1 * | 4/2004 | Hamilton et al. ............ 702/182 |
| 2004/0068713 A1 * | 4/2004 | Yannakoyorgos et al. ... 717/101 |
| 2004/0153821 A1 | 8/2004 | Kuhmann et al. |
| 2004/0249914 A1 | 12/2004 | Flocken et al. |
| 2005/0120273 A1 * | 6/2005 | Hudson et al. ................ 714/38 |
| 2005/0138486 A1 * | 6/2005 | Gromyko ..................... 714/49 |
| 2005/0149805 A1 * | 7/2005 | Syed et al. ................... 714/741 |

(Continued)

OTHER PUBLICATIONS

"Microsoft Online Crash Analysis" http://oca.microsoft.com/en/welcome.aspx.

(Continued)

*Primary Examiner*—Scott T. Baderman
*Assistant Examiner*—Loan L. T. Truong
(74) *Attorney, Agent, or Firm*—Thorpe North & Western LLP

(57) ABSTRACT

Described herein is technology for, among other things, accessing error report information. It involves various techniques and tools for analyzing and interrelating failure data contained in error reports and thereby facilitating developers to more easily and quickly solve programming bugs. Numerous parameters may also be specified for selecting and searching error reports. Several reliability metrics are provided to better track software reliability situations. The reliability metrics facilitate the tracking of the overall situation of failures that happen in the real word by providing metrics based on error reports (e.g., failure occurrence trends, failure distributions across different languages).

19 Claims, 6 Drawing Sheets

U.S. PATENT DOCUMENTS

2005/0204200 A1 9/2005 Gadangi et al.
2005/0289404 A1* 12/2005 Maguire ...................... 714/57
2006/0123389 A1* 6/2006 Kolawa et al. ............. 717/101
2006/0136784 A1* 6/2006 Prescott et al. ................ 714/38
2006/0156077 A1 7/2006 Altaf et al.
2006/0190770 A1 8/2006 Harding
2006/0217202 A1* 9/2006 Burke et al. .................. 463/42
2006/0242706 A1* 10/2006 Ross ........................... 726/23
2007/0006041 A1* 1/2007 Brunswig et al. ............. 714/38
2007/0074149 A1* 3/2007 Ognev et al. ................ 717/101
2007/0100662 A1* 5/2007 Suwalski et al. ............... 705/2
2007/0168343 A1* 7/2007 Best et al. ...................... 707/5
2007/0277059 A1* 11/2007 Ogawa ........................ 714/54
2008/0046484 A1* 2/2008 Ellis et al. ................... 707/204
2008/0320343 A1* 12/2008 Eickmeyer et al. ............ 714/57

OTHER PUBLICATIONS

"Windows Error Reporting: Getting Started", http://www.microsoft.com/whdc/maintain/StartWER.mspx.

* cited by examiner

SOFTWARE ERROR REPORT ANALYSIS

BACKGROUND

As computer programs become increasingly more advanced and include more features the ability to quickly and easily solve bugs, error, or code defects becomes increasingly important. Bugs that result in a complete program termination or crash need immediate attention and resolution because of the impact on usability and value of a software program. Operating systems and applications may contain functionality such that information (e.g., memory dumps, callstack dumps and specific runtime information) can be stored locally or sent to a centralized machine or resource after a software failure (e.g., crash, hang, or the like). Once failure information has been collected, the information needs to be reviewed and analyzed by a developer in order for the bug to be fixed. The information can also be used to understand the overall reliability situation of specific software in real world.

Conventional applications or systems for accessing error report information have several short comings which can hinder the investigation and resolution of the programming bugs. For example, there may be large amounts of data in the error reports but not all the information (e.g., specific programming runtime details) may be easily accessible by a developer. Further, there may be few or no options or choices for interrelating failure data from multiple error reports. For example, the same bug could cause a program to fail in different places, thus it would be helpful for the developer to examine related error reports. In some cases, a developer may have to determine interrelated error reports manually. This may require a developer write complex programs to find interrelated error reports. Thus, such limitations make more work and slow the process of identifying and resolving bugs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, accessing error report information. It involves various techniques and tools for analyzing and interrelating failure data contained in error reports and thereby facilitating developers to more easily and quickly solve programming bugs. Numerous parameters may also be specified for selecting and searching error reports. Several reliability metrics are provided to better track software reliability situations. The reliability metrics facilitate the tracking of the overall situation of failures that happen in the real word by providing metrics based on error reports (e.g., failure occurrence trends, failure distributions across different languages).

Techniques described herein provide accessing and analyzing error reports in a manner that facilitates rich access by developers, testers, and development managers. Thus, developers, testers, and development managers are able to more easily use and understand error reports thereby allowing bugs to be resolved quickly with increased ease and allowing better understanding of software reliability situations in the real world.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Figure 1:
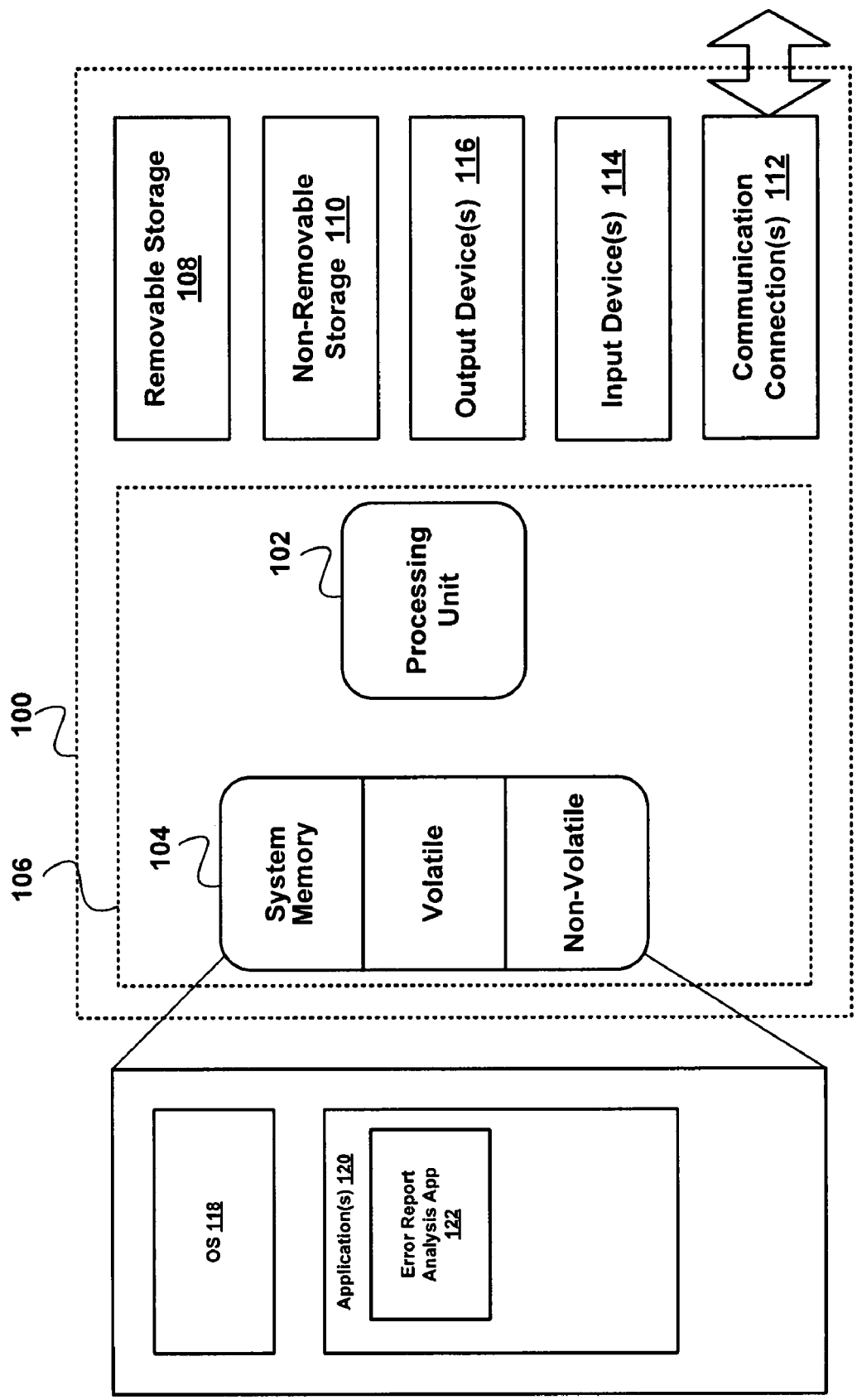
FIG. 1 is a block diagram of an exemplary computing system environment for implementing an embodiment.

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail so as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Overview

Described herein is technology for, among other things, accessing error report information. It involves various techniques and tools for analyzing and interrelating failure data contained in error reports and thereby facilitating developers to more easily and quickly solve programming bugs. Numerous parameters may also be specified for selecting and searching error reports. Several reliability metrics are provided to better track software reliability situation. The reliability metrics facilitate the tracking of the overall situation of failures that happen in the real word by providing metrics based on error reports (e.g., failure occurrence trends, failure distributions across different languages).

Techniques described herein provide accessing and analyzing error reports in a manner that facilitates rich access by developers, testers, and development managers. Thus, developers, testers, and development managers are able to more easily use and understand error reports thereby allowing bugs to be resolved quickly with increased ease and allowing better understanding of software reliability situations in the real world Example Operating Environments With reference to FIG. 1, an exemplary system for implementing embodiments includes a general purpose computing system environment, such as computing system environment 100. Computing system environment 100 may include, but is not limited to, desktop computers, laptops, tablet PCs, mobile devices, and smartphones. In its most basic configuration, computing system environment 100 typically includes at least one processing unit 102 and memory 104. Depending on the exact configuration and type of computing system environment, memory 104 may be volatile (such as RAM), non-volatile (such as ROM, flash memory, etc.) or some combination of the two. This most basic configuration is illustrated in FIG. 1 by dashed line 106.

System memory 104 may include, among other things, Operating System 118 (OS), application(s) 120, error report analysis application 122. Application(s) 120 may include a variety of applications some of which may access data and resources on a computer network. Error report analysis application 122 facilitates the analysis of and access to error reports by developers, testers, and development managers.

Additionally, computing system environment 100 may also have additional features/functionality. For example, computing system environment 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data.

Memory 104, removable storage 108 and nonremovable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 100. Any such computer storage media may be part of computing system environment 100.

Computing system environment 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 112 may allow computing system environment 100 to communicate over various networks types including, but not limited to, Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated that various network types that communication connection(s) 112 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 100 may also have input device(s) 114 such as a keyboard, mouse, pen, voice input device, touch input device, remote control, etc. Output device(s) 116 such as a display, speakers, etc. may also be included. All these devices are well known in the art and need not be discussed at length here.

Figure 2:
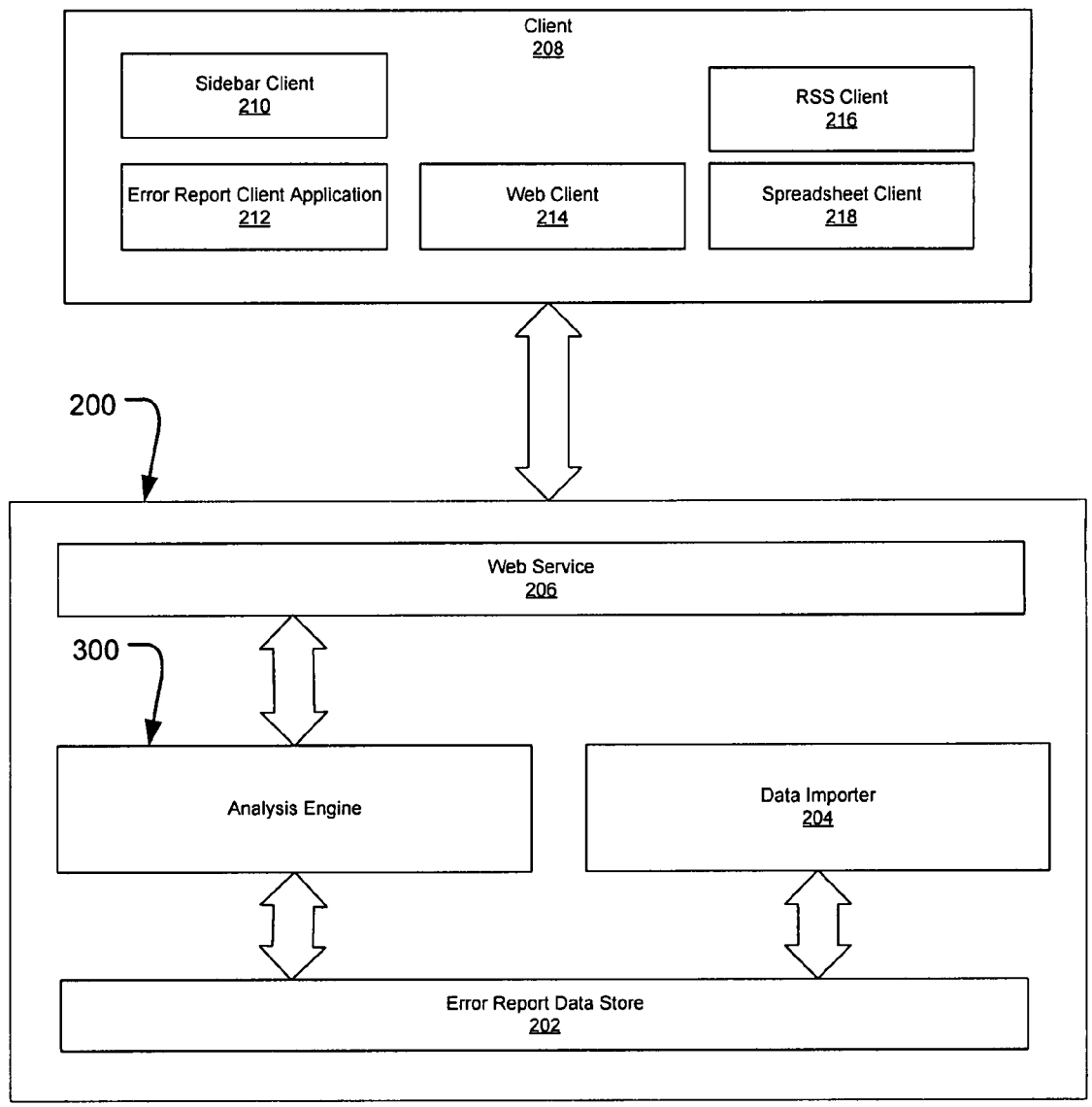
FIG. 2 is a block diagram of an exemplary operating environment of a system for analyzing error reports, in accordance with an embodiment.

FIG. 2 shows another view of an exemplary environment for implementing embodiments. In one embodiment, system 300 may be part of a system 200 to facilitate access, analysis, and updating of error reports. System 300 is an analysis engine, for performing analysis of error reports. For example, client system 208 may make or be used to make requests for error report information and analysis performed by analysis engine 300. System 200 may include error report data store 202, data importer 204, web service 206, and analysis engine 300.

Error report data store 202 may be a computer-readable medium that is removable or non-removable (e.g., removable storage 108 or non-removable storage 110 respectively). Error report data store 202 may be used to store error reports and associated data which are received and stored by data importer 204. For example, Error report data store 202 may contain error reports containing memory dumps and other program information. The error reports may be from applications, operating systems, drivers, and the like which have failed (e.g., crashed, hung, or the like).

Web service 206 may receive and respond to requests from client 208. For example, web service 206 may be a web server application. The requests from client 208 for analyzed error reports or data may be received by web service 206 and then forwarded on to analysis engine 300. Analysis engine 300 may then return the requested analyzed error reports to web service 206 for sending to client 208.

Client system 208 may include a variety of client applications. More specifically, client system 208 may include sidebar application 210, error report client application 212, web client 214, RSS client 216, and spreadsheet client 218. Client system 208 may communicate with system 200 via a computer network (e.g., LAN, internet, or the like). Side bar client 210 may be an application that occupies a fixed portion of the screen and displays various information, including error reports and analyzed error report information. Error report client application 212 may be a specialized application for accessing and managing error report data and analyzed error report information. Web client 214 may be a web browser and be used to make requests for error reports and analyzed error report information. Really Simple Syndication (RSS) client 216 may receive a XML or RSS feed from system 200 which contains error report data and analyzed error report information. Spreadsheet client 218 may be a spreadsheet application with functionality or support for requesting and accessing error reports and analyzed error report information. It is appreciated that all of the clients or applications described herein of client system 208 may present error report and analyzed error report information to a user and allow the user to browse, search, and conduct analysis against the error report data. Clients 210, 212, 214, 216 and 218 provide rich channels for users to access analysis results. For example, Sidebar client 210 may display several important numbers that are highly related to a developer/tester (for example, number of error reports that needs to be fixed by him, the total number of error reports received for his/her application). This enables users to be kept aware of up-to-date important information. Error report client application 212 can enable users to conduct complex analysis and could present complex analysis result to users. Users may choose different channels to access error report information in different scenarios.

The claimed subject matter is described in terms of these example environments. Description in these terms is provided for convenience only. It is not intended that the invention be limited to application in this example environment. In fact, after reading the following description, it will become apparent to a person skilled in the relevant art how to implement the claimed subject matter in alternative embodiments.

Example System

Figure 3:
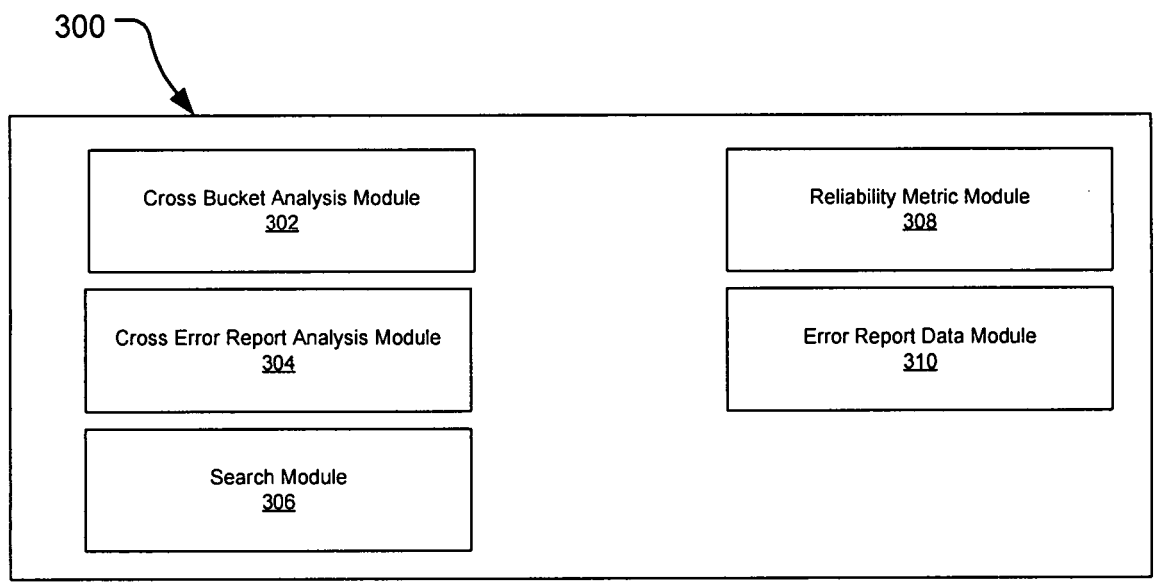
FIG. 3 is a block diagram of an exemplary system for analyzing error reports in accordance with an embodiment.

The following discussion sets forth details of the present technology systems for analyzing and accessing error report information. FIG. 3 illustrates example components used by various embodiments of the present technology. System 300 includes components or modules that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1. The computer-readable and computer-executable instructions are used to control or operate in conjunction with, for example, processing unit 102 of FIG. 1. It should be appreciated that the aforementioned components of system 300 can be implemented in hardware or software or in a combination of both. Although specific components are disclosed in system 300 such components are examples. That is, embodiments are well suited to having various other components or variations of the components recited in system 300. It is appreciated that the components in system 300 may operate with other components than those presented, and that not all of the components of system 300 may be required to achieve the goals of system 300.

FIG. 3 shows a block diagram of an exemplary system 300 for accessing error report information, in accordance with an embodiment. System 300 includes cross bucket analysis module 302, cross error report analysis module 304, search module 306, reliability metric module 308, and error report data module 310.

Error report data module 310 handles access to error reports and associated information. In one embodiment, associated information may include, but is not limited to: local variables, call stack information, register (e.g., CPU register) information, and function and class failure information (e.g., the function and class where the crash occurred). A call stack may include a function calling sequence of a program during runtime. For example, as a program runs a first main function may call a second function which calls a third function where an application fails. This call stack information can be useful for determining what sequence of function was performed when the program failed and the corresponding value of local variables within the scope of the functions when the failure occurred.

Error report data module 310 may group error reports into buckets. Each bucket may have substantially similar kinds of error or code defect. In one embodiment, the error reports that go into a specific bucket may be determined based on having the same: application name, application version, failure module, module version, offset, and exception code. An offset may be the relative distance from the start of a module or a program that execution was at before a failure occurred. Thus, error reports with the same application name, version, failure module, module version, offset, and exception code may go into the same bucket.

Cross bucket analysis module 302 may help a developer determine if there are similar buckets which may reflect the substantially similar code defects or bugs. Similar buckets may be determined based on a plurality of parameters, including but not limited to: buckets with the same function responsible for the failure, buckets which vary only on the exception code, buckets with only different application versions, buckets which vary only on module version, and buckets with a close offset and all other parameters the same.

Cross error report analysis module 304 may facilitate a developer in investigating a specific error report by finding similar error reports. For example, there may be cases where error reports that have been classified into different buckets but have the exact same or similar call stack. A similar call stack can be defined as the portion of calling functions between two call stacks are the same. Thus, allowing the error reports to be investigated together. In another example, if a bug is fixed for one error report all the bugs in all other error reports with the same or similar call stack are fixed.

Error reports information (e.g., call stack, local variable value, global variable value) may also be aggregated for a group of error reports. This aggregation can provide an easy way for developers to investigate multiple error reports quickly. For example, a group of error reports could be located in several buckets and thus a developer needs to determine which error report to drill down or investigate to solve the bug. In one embodiment, the aggregation can be carried out by finding similar parts of the call stacks for all of the error reports and obtaining the distribution of local variable values in the same frame level or index of the call stack. Thus, the local variable values are returned for all error reports with substantially similar function call sequences. This will allow a developer to see what the value of local variables were when the program failed and thereby assist the developer in understanding and determining the cause of the failure. The aggregation may also be useful for a developer to determine which error reports to investigate.

Search Module 306 provides users the ability to search buckets and error reports using a wide variety of bucket and error report parameters. For example, a developer may wish to search for error reports based on the operating system, operating system version, and language of the operating system.

Reliability metric module 308 may include a variety of tools for accessing metrics based on error reports and analyzed error report information. In one embodiment, information may be displayed customized to a specific user. For example, a developer may be presented with all the bugs that are assigned to him/her, timely bucket hit information, and bucket and error report information. The bug may have been assigned to a developer by a tester or development manager. Status information on bugs may further be displayed and users may update status information after a bug has been resolved. Such an interface may facilitate the developer navigating and investigating buckets and error reports.

Another tool may allow a user (e.g., tester or development manager) to access and display reliability metric information. For example, for a specific application and version, a development manager may be shown temporal bug trends, temporal bucket trends, total hits trends, distribution of hits across: buckets, functions, and the weak point of an application or module.

Hits may be the number of failures that have occurred in a specific time or for a selected bucket. For example, developer may wish to see how many failures have resulted from a specific bug in a single day or month. The number of hits in a bucket can indicate the priority or seriousness of a bug or code defect. For example, bugs with a high number of hits may drastically impact software product reliability and usability. In one embodiment, the number of hits can be displayed in a graph to show the number of hits over time. The number of function or symbol hits may also show which functions have defects, resulting in a large number of failures. Further, a distribution or graph may be displayed showing the hit distribution across the functions of each bucket.

In another embodiment, a user may be presented with a variety of analysis tools. A bucket visualization tool may show basic information of a bucket and cross-bucket correlation information as well as call stack and local variable aggregation as described herein. Similarly, an error report visualization tool may show details from a single error report and interrelated or cross referenced error reports.

An error report and bucket search tool may allow a user to specify a wide variety of parameters for buckets and error reports and provide results which include buckets and error reports. Similarly, a bug search tool may allow a user to specify a plurality of parameters and receive a list of bugs satisfying the specified parameters.

An application pulse tool may allow users to specify an application or module name and a corresponding list of versions and receive reliability information as described herein. A temporal trend tool may allow a user to specify various parameters and receive bucket hits trends over time as described herein but not limited as such. A bucket and function hit distribution tool allows a user to select buckets and/or function and see hit distributions (e.g., graphs) over time as described herein.

The weak point of a module or application may also be displayed. In one embodiment, the weak point may be determined based on hits across each module or class or functions. For example, the worst module may be identified based on being the cause of more failures than the other modules and thus having the highest hit count. The hits of a class may be based on the hits or failures that occur in any function in the class.

An error report visualization tool may show all information available from an error report (e.g., local variables, registers, top 64 bytes of call stack, and the like) and cross error report information as described herein.

The pulse of an application may also be displayed which allows a user to specify an application or module and a corresponding version and get all reliability metrics, as described herein, for the application or module (e.g., temporal trends, hits distributions, weak points, and the like).

Example Operations

Figure 4:
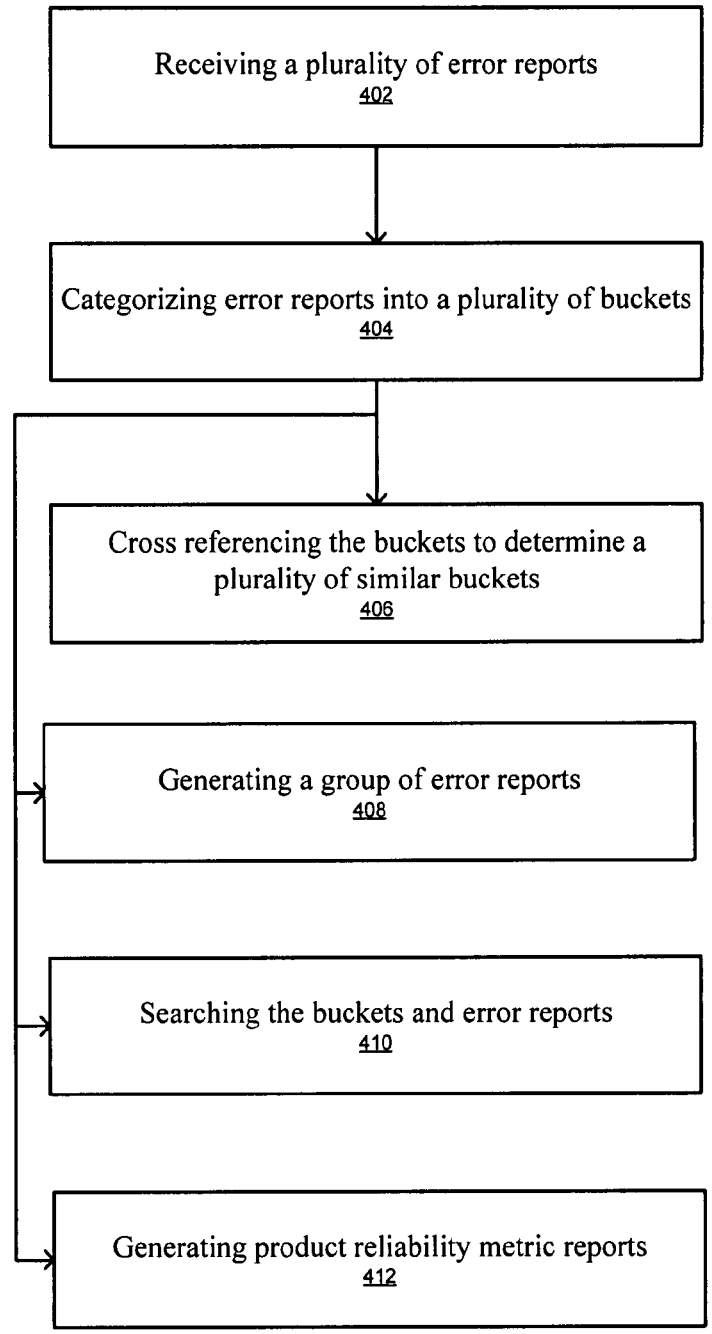
FIG. 4 is a flowchart of an exemplary process for analyzing error report information, in accordance with an embodiment.
Figure 5:
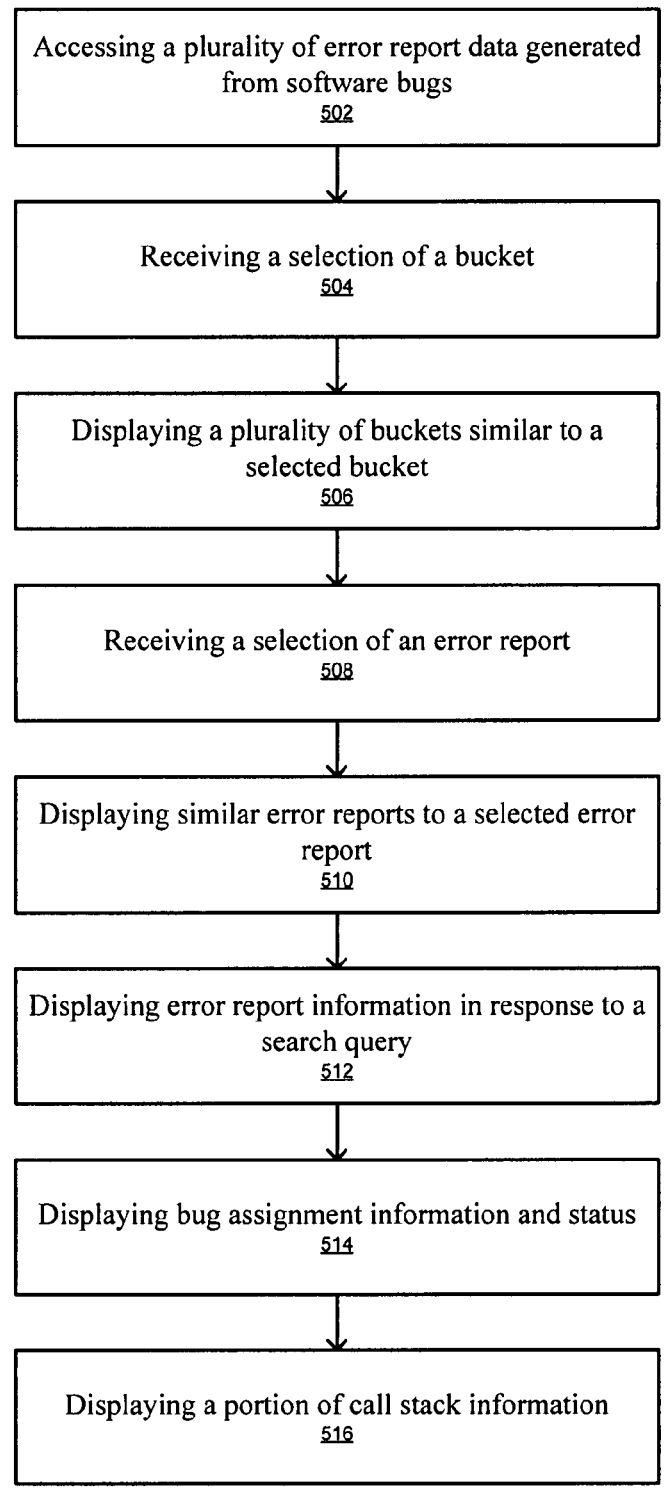
FIG. 5 is a flowchart of an exemplary process for displaying error report information, in accordance with an embodiment.

The following discussion sets forth in detail the operations of the present technology for analysis error report data. With reference to FIGS. 4-5, flowcharts 400 and 500 each illustrate example blocks used by various embodiments of the present technology. Flowcharts 400 and 500 include processes that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1. The computer-readable and computer-executable instructions are used to control or operate in conjunction with, for example, processing unit 102 of FIG. 1. Although specific blocks are disclosed in flowcharts 400 and 500, such blocks are examples. That is, embodiments are well suited to performing various other blocks or variations of the blocks recited in flowcharts 400 and 500. It is appreciated that the blocks in flowcharts 400 and 500 may be performed in an order different than presented, and that not all of the blocks in flowcharts 400 and 500 may be performed.

FIG. 4 is a flowchart 400 of an exemplary processes which a system can be configured to perform, in accordance with an embodiment. The blocks of flowchart 400 may be carried out by a computer acting as a web server. It is appreciated the computer (e.g., system 100) carrying out the blocks of flowchart 400 may not necessarily be a specialized server computing system but rather a computer which is providing resources or services and thus may be acting as a server in a peer to peer network. In one embodiment, the blocks of flowchart 400 may be initiated or otherwise performed by a client (e.g., client system 208).

At block 402, a plurality of error reports are received. The error reports may have been received from a local computing system or remote computing systems via a computer network. Further, the reports may contain data after the failure of an application, operating system, driver, or other software program.

At block 404, error reports are categorized into a plurality of buckets. As described herein, error reports may be categorized or grouped based on similar parameters, including but not limited to, application name, application version, failure module, module version, and offset.

At block 406, the buckets are cross referenced to determine a plurality of similar buckets. The similar buckets may reflect the same bugs or code defects. As described herein, substantially similar buckets may be determined based on a plurality of parameters, including but not limited to: buckets with the same function or symbol responsible for the failure, buckets which vary only on the exception code but no other parameters, buckets with a different application versions but the same other parameters, buckets with different module version but the same other parameters, and buckets with a close offset and all other parameters the same.

At block 408, a group of error reports is generated. In one embodiment, as described herein but not limited as such, a group may be based on the call stacks contained in the error reports. Further, as described herein, call stack and local variable value information may be aggregated for grouping error reports.

At block 410, buckets and error reports are searched. In one embodiment, the search may be have been initiated by a user (e.g., developer, tester, development manager, or the like) and contain a plurality of bucket or error report parameters as described herein. The search results may contain buckets and error reports.

At block 412, product reliability metric reports are generated. As described herein, the product reliability metrics may include, but are not limited to, temporal bug trends, temporal bucket trends, total hits trends, the weak point of an application, module, or class, and distribution of hits across: buckets, functions and classes.

FIG. 5 is a flowchart 500 of an exemplary process for displaying error report information, in accordance with an embodiment. Error report information may be displayed on a client device (e.g., client system 208). It is appreciated that error report information and analyzed error report information may be displayed as part of the tools described herein.

At block 502, a plurality of error report data generated from software bugs are accessed. As described herein, the error reports may be from the failures of applications, operating systems, drivers, and the like and stored in a central database. The error report data may be stored locally or remotely.

At block 504, a selection of a bucket is received. The bucket may be a group of similar error reports that were grouped as described here. The selection may have been made by a developer, tester, or development manager. In one embodiment, the selection may be received from a user via a web browser (e.g., web client 214).

At block 506, a plurality of buckets similar to a selected bucket are displayed. As described herein, a plurality of similar buckets may have been determined based on cross referencing the buckets based on parameters including, but not limited to, buckets with the same function or symbol responsible for the failure, buckets which vary only on the exception code but no other parameters, buckets with different application versions but the same other parameters, buckets with different module versions but the same other parameters, and buckets with a close offset and all other parameters the same.

At block 508, a selection of an error report is received. The selection may be received from a user via a web browser (e.g., web client 214) from a developer in the process of investigating a bug.

At block 510, a plurality of similar error reports similar to a selected error report is displayed. As described herein, the similar error reports may be determined based on the same or similar call stacks and include similar sets of local variables.

At block 512, error report information in response to a search query is displayed. The search may be based on a variety of search parameters as described herein and results may include buckets or error reports. Further, the search query may include error report parameters and return a set of buckets or error reports matching the parameters.

At block 514, bug assignment and status information is displayed. In one embodiment, as described herein, a developer may access a page which shows all the bugs assigned to him/her. The bugs may have been assigned by a development manager and the bugs may have been discovered by testers. In one embodiment, the bug assignment and status information may be displayed by a web browser (e.g., client system 208). A developer may be able to update status information (e.g., change a bug status to resolved).

At block 516, a portion of call stack information is displayed. As described herein, call stack information can be used to determine similar error reports and a developer can use the information in investigating and determining the cause of a bug. In one embodiment, the top 64 bytes of the call stack information may be displayed.

Example User Interface

Figure 6:
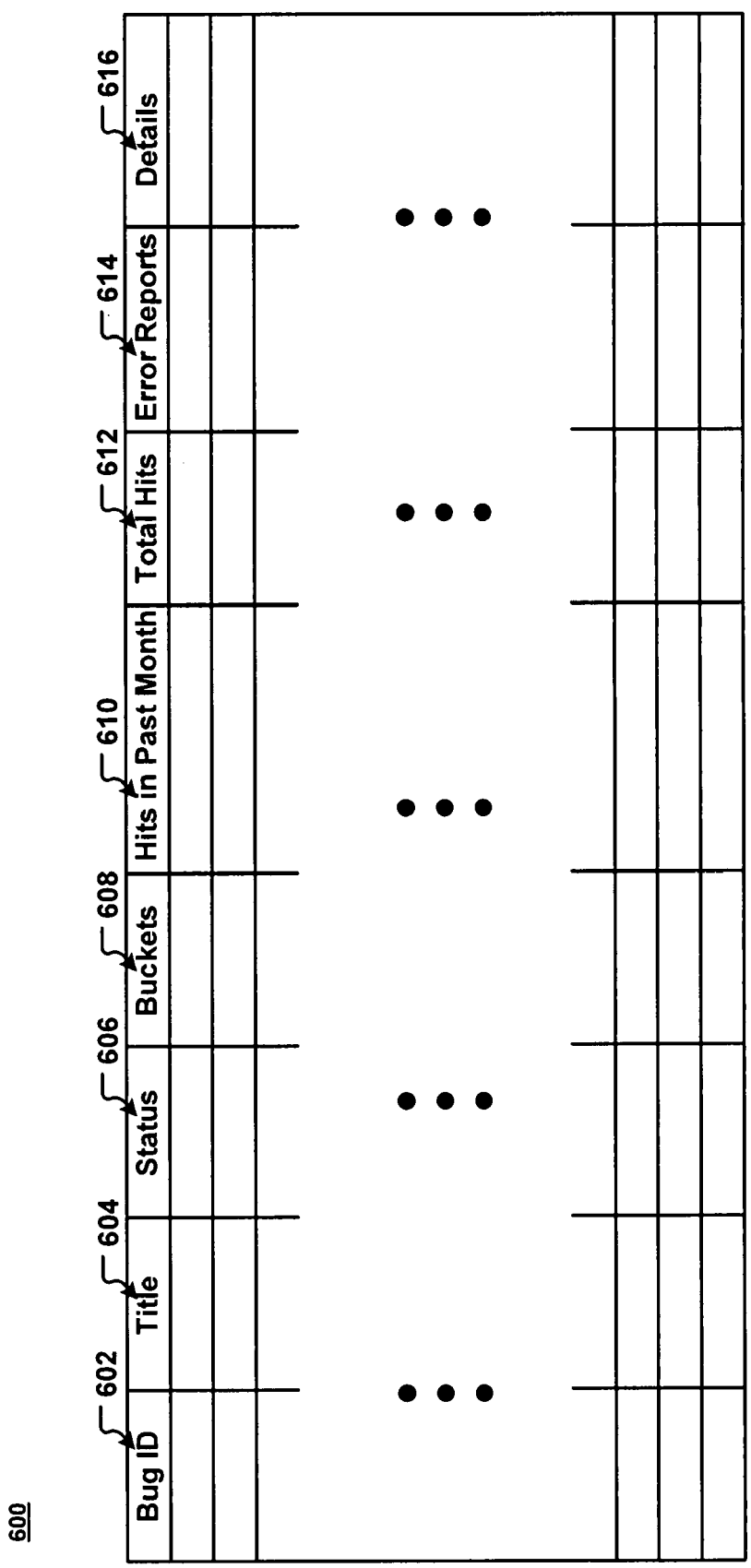
FIG. 6 is an exemplary graphical user interface for accessing error report information, in accordance with an embodiment.

FIG. 6 shows an exemplary graphical user interface 600 for accessing error or bug report information, in accordance with an embodiment. Graphical user interface 600 may include bug ID column 602, title column 604, status column 606, buckets column 608, hits in past month column 610, total hits columns 612, error reports column 614, and details column 616. It is appreciated that columns 602-616 and the descriptions herein are exemplary and are not to be limited as such. Further, it is appreciated graphical user interface 600 may allow a user to select and access additional information described herein and the additional information may be displayed by another GUI. For example, the graphical user interface may be used for a "My Bugs" tool which includes various tools, as described herein, for facilitating access to error reports by a developer.

Bug ID column 602 may contain a unique identifier for a specific bug. Title column 604 may contain a title for a bug which may contain an indicator of a type of bug. Status Column 606 provides and allows the setting of the status of a bug as described herein. In one embodiment, the status may have values of "resolved", "active", and "closed." Hits in past month column 610 shows the number of hits in the past month for each bug as described herein and not limited as such. Total hits column 612 may contain the total number of hits for each bug as described herein and not limited as such. Error reports column 614 may include the number of error reports associated with the bug as described herein and not limited as such. Details column 616 may include details (e.g., priority for fixing, feature area of this bug) entered by users including, but not limited to, developers, testers, and development managers as described herein and not limited as such.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for accessing error report data, comprising:
   an error report data module configured to group error reports into buckets based on similar types of code defects using a processing unit;

a cross bucket analysis module for cross referencing buckets using the processing unit to determine a plurality of similar buckets based on a plurality of similar bucket characteristics selected from the group of: buckets with a same function responsible for failure, buckets which vary only by an exception code, buckets with only different application versions, buckets which vary only on module version, and buckets with a close offset while other parameters are constant;

a cross error report analysis module for cross referencing error data reports using the processing unit to determine a plurality of similar error reports; and wherein the error report data module is configured for accessing error report data and associated data and storing error report information in a memory unit coupled to said processing unit.

2. The apparatus as recited in claim 1 further comprises:
a reliability metric calculation module for calculating reliability metrics from error report data to facilitate the understanding of the overall reliability situation of a software program in the real world.

3. The apparatus as recited in claim 1 further comprises:
a search module for searching error report data.

4. The apparatus as recited in claim 1 further comprises:
an error report data aggregation module for facilitating displaying and analyzing of multiple error reports.

5. The apparatus as recited in claim 1 wherein said similar error reports are determined based on substantially similar call stacks.

6. The apparatus as recited in claim 1 wherein a user is presented with customized information.

7. The apparatus as recited in claim 1 wherein said similar buckets and similar error reports facilitate understating of a specific bucket or error report.

8. A system for analyzing error report information, the system comprising:
a processing unit, wherein said processing unit executes computer-executable instructions;
a memory unit coupled to said processing unit, wherein said memory unit store software programs;
a plurality of communication connections coupled to said processing unit, wherein said communication connections facilitate interaction with users and other computing systems; and
a storage unit for storing error report information coupled to said processing unit, wherein said system is configured to:
receive a plurality of error reports;
categorize said error reports into a plurality of buckets, wherein said buckets are groups of similar error data reports based on similar types of code defects;
cross reference said buckets to determine a plurality of similar buckets based on a plurality of similar bucket characteristics selected from the group of: buckets with a same function responsible for failure, buckets which vary only by an exception code, buckets with only different application versions, buckets which vary only on module version, and buckets with a close offset while other parameters are constant; and generate a group of error reports, wherein said group is based on substantially similar data contained in said error reports.

9. The system as recited in claim 8 wherein said group of error data reports is generated based upon similar call stacks.

10. The system as recited in claim 8 wherein said group of error data reports is generated based upon similar variable values.

11. The system as recited in claim 8 wherein said system is further configured to:
search said buckets and error data reports based on a plurality of search parameters.

12. The system as recited in claim 8 wherein said system is further configured to:
generating product reliability metric reports.

13. The system as recited in claim 12 wherein said product reliability metric reports comprises temporal error trends.

14. The system as recited in claim 12 wherein said product reliability metric reports comprises a plurality of bucket hit trends.

15. The system as recited in claim 12 wherein said product reliability metric reports comprises a weak point of an application or module or class or function.

16. A non-transitory computer-readable storage medium having computer-executable instructions for performing steps comprising:
receiving a plurality of error report data generated from software bugs;
grouping error reports into a selection of buckets based on types of code defects;
displaying a plurality of buckets substantially similar to a selected bucket by cross referencing buckets to determine similar buckets based on a plurality of similar bucket characteristics selected from the group of: buckets with a same function responsible for failure, buckets which vary only by an exception code, buckets with only different application versions, buckets which vary only on module version, and buckets with a close offset while other parameters are constant;
receiving a selection of an error report; and
displaying substantially similar error data reports to a selected error report by cross referencing similar error data reports.

17. The non-transitory computer-readable storage medium of claim 16 having computer-executable instructions further comprising:
displaying error report information in response to a search query.

18. The non-transitory computer-readable storage medium of claim 16 having computer-executable instructions further comprising:
displaying bug assignment information and status.

19. The non-transitory computer-readable storage medium of claim 16 having computer-executable instructions further comprising:
displaying aggregated error report data.

* * * * *